United States Patent [19]

Midorikawa et al.

[11] Patent Number: 5,591,279
[45] Date of Patent: Jan. 7, 1997

[54] PNEUMATIC VEHICLE TIRE

[75] Inventors: Shingo Midorikawa; Masaaki Harada; Takanori Kondoh, all of Hiratsuka, Japan

[73] Assignee: The Yokohama Rubber Co., Ltd., Japan

[21] Appl. No.: 246,276

[22] Filed: May 19, 1994

[30] Foreign Application Priority Data

May 20, 1993 [JP] Japan .................................. 5-118669
May 20, 1993 [JP] Japan .................................. 5-118671

[51] Int. Cl.⁶ ............................................ B60C 11/00
[52] U.S. Cl. .................... 152/209 R; 152/210; 152/458; 524/494; 525/236; 525/935
[58] Field of Search ................... 152/209 R, 209 D, 152/458, 210; 523/156; 524/494; 525/156, 236, 935

[56] References Cited

U.S. PATENT DOCUMENTS

| 4,826,911 | 5/1989 | Suzuki et al. | 525/236 |
| 5,173,136 | 12/1992 | Agarwal et al. | 152/209 R |

FOREIGN PATENT DOCUMENTS

| 63-92659 | 4/1988 | Japan . | |
| 63-172750 | 7/1988 | Japan . | |
| 145205 | 6/1989 | Japan | 152/209 R |
| 167353 | 6/1990 | Japan | 152/209 R |
| 170840 | 7/1990 | Japan | 152/209 R |
| 3-10907 | 1/1991 | Japan . | |
| 4-38209 | 2/1992 | Japan . | |
| 176707 | 6/1992 | Japan | 152/209 D |
| 221206 | 8/1992 | Japan | 152/209 R |

OTHER PUBLICATIONS

Abstract for Japan 4-38209.
Abstract for Japan 2-170840.

*Primary Examiner*—Steven D. Maki
*Attorney, Agent, or Firm*—Finnegan, Henderson, Farabow, Garrett & Dunner, L.L.P.

[57] ABSTRACT

A pneumatic tire having a tread composed of a matrix rubber, a low hardness rubber powder, hollow particulates, and short fibers, and optionally a liquid polymer, wherein the low hardness rubber powder has an average particle size of less than 1000 μm, including or not including no more than 20 parts by weight of carbon per 100 parts by weight of the rubber component in the low hardness rubber powder, and is contained in an amount of 1 to 10 parts by weight per 100 parts by weight of the matrix rubber, the hollow particulates have an average particle size of 10 to 120 μm and an average thickness of 0.1 to 15 μm, and the short fibers have an aspect ratio (ratio of length/diameter) of 10 to 1000.

4 Claims, 2 Drawing Sheets

PNEUMATIC VEHICLE TIRE

BACKGROUND OF THE INVENTION

1. Field of the Invention

The present invention relates to a pneumatic vehicle tire, more specifically relates to a pneumatic vehicle tire which improves the running performance on ice and snow, in particular, the running performance on ice and snow at initial and with the elapse of time, while maintaining the good wear resistance (or without substantially reducing the wear resistance).

2. Description of the Related Art

In the past, when driving a car in the winter season in areas with large snowfall, use has been made of tires with spikes embedded in them, i.e., spiked tires, or snow chains are attached to the tires, so as to ensure safety when driving on snow- and ice-covered roads. Spiked tires and snow chains, however, tend to cause wear and damage to the roads, and as a result, dust and causing air pollution are created, and major environmental problems are caused. To resolve these safety and the environmental problems, the use of studless tires which have braking ability and traction on snow- and ice-covered roads, without the use of spikes and chains, is rapidly spreading.

As such studless tires, there have been proposed tires with treads obtained by mixing into the matrix rubber a low hardness vulcanized rubber composition with a high adhesive effect (i.e., an ability of the tread surface to contact the ice-covered road surface and follow the shape of the same) so as to improve the frictional force on the ice (see Japanese Unexamined Patent Publication (Kokai) No. 63-92659, Japanese Unexamined Patent Publication (Kokai) No. 63-172750, Japanese Unexamined Patent Publication (Kokai) No. 4-38209, Japanese Unexamined Patent Publication (Kokai) No. 3-10907, etc.)

Japanese Unexamined Patent Publication (Kokai) No. 63-92659 discloses a pneumatic vehicle tire containing a soft vulcanized rubber powder having a glass transition point of no more than $-50°$ C. and a particle size of 1000 µm or less. However, the adhesive effect of this matrix rubber is not sufficient and the performance thereof on ice is not necessarily satisfactory.

On the other hand, Japanese Unexamined Patent Publication (Kokai) No. 60-139503 discloses a studless tire using tread rubber containing high hardness rubber particles. However, the adhesive effect of the rubber particles themselves was low, and therefore, the performance on ice was not necessarily satisfactory.

Further, Japanese Unexamined Patent Publication (Kokai) No. 4-38209 discloses the compounding of low hardness rubber particles and short fibers. However, the diameter of the rubber particles was relatively large, and therefore, the wear resistance and the mixing and processing ability were insufficient. Further, Japanese Unexamined Patent Publication (Kokai) No. 3-10907 proposes the compounding, to the matrix rubber, a low hardness preliminalily vulcanized rubber composition having an average particle size of 0.5 to 3 mm so as to improve the performance on ice. However, this pneumatic vehicle tire also is insufficient in the adhesive effect of the matrix rubber and the performance on ice is not necessarily satisfactory.

As mentioned above, the prior art had the problem that the frictional force on ice is not sufficient and the mixing and processing ability are poor.

SUMMARY OF THE INVENTION

Accordingly, the objects of the present invention are to eliminate the above-mentioned problems in the prior art, in particular to provide a pneumatic vehicle tire which remarkably improves the running performance on ice and snow and is superior in the wear resistance and the mixing and processing ability.

Other objects of the present invention are to provide a pneumatic vehicle tire which remarkably improves the running performance on ice and snow, especially both at initial and with the elapse of time.

In accordance with the present invention, there is provided a pneumatic vehicle tire having a tread comprising a matrix rubber, a low hardness rubber powder, hollow particulates, and short fibers, wherein (i) the low hardness rubber powder has an average particle size of less than 1000 µm, includes or does not include 20 parts by weight or less of carbon black per 100 parts by weight of the rubber component in the low hardness rubber powder, and is contained in an amount of 1 to 10 parts by weight per 100 parts by weight of the matrix rubber, (ii) the hollow particulates has an average particle size of 10 to 120 µm and an average thickness of 0.1 to 15 µm, and (iii) the short fibers have an aspect ratio (ratio of length/diameter) of 10 to 1000.

In accordance with the present invention, there is also provided a pneumatic vehicle tire having a tread comprising a matrix rubber, a low hardness rubber powder, hollow particulates, a liquid polymer, and short fibers, wherein (i) the low hardness rubber powder has an average particle size of less than 1000 µm, includes or does not include 20 parts by weight or less of carbon black per 100 parts by weight of the rubber component in the low hardness rubber powder, and is contained in an amount of 1 to 10 parts by weight per 100 parts by weight of the matrix rubber, (ii) the hollow particulates has an average particle size of 10 to 120 µm and an average thickness of 0.1 to 15 µm, (iii) the liquid polymer is a low molecular weight diene polymer having a weight-average molecular weight of 6,000 to 60,000 and being contained in an amount of 5 to 50 parts by weight per 100 parts by weight of the matrix rubber, and (iv) the short fibers have an aspect ratio (ratio of length/diameter) of 10 to 1000.

BRIEF DESCRIPTION OF THE DRAWINGS

The present invention will be better understood from the description set forth below with reference to the accompanying drawings, wherein.

DESCRIPTION OF THE PREFERRED EMBODIMENTS

The structure of the pneumatic vehicle tire according to the present invention is not particularly limited. It may be any structure of a pneumatic vehicle tire which has been conventionally known and further may be one of the various structures of pneumatic tires currently under development. The point is that the tread be made the above structure.

Below, an Example will be explained with reference to the attached FIG. 1.

Figure 1:
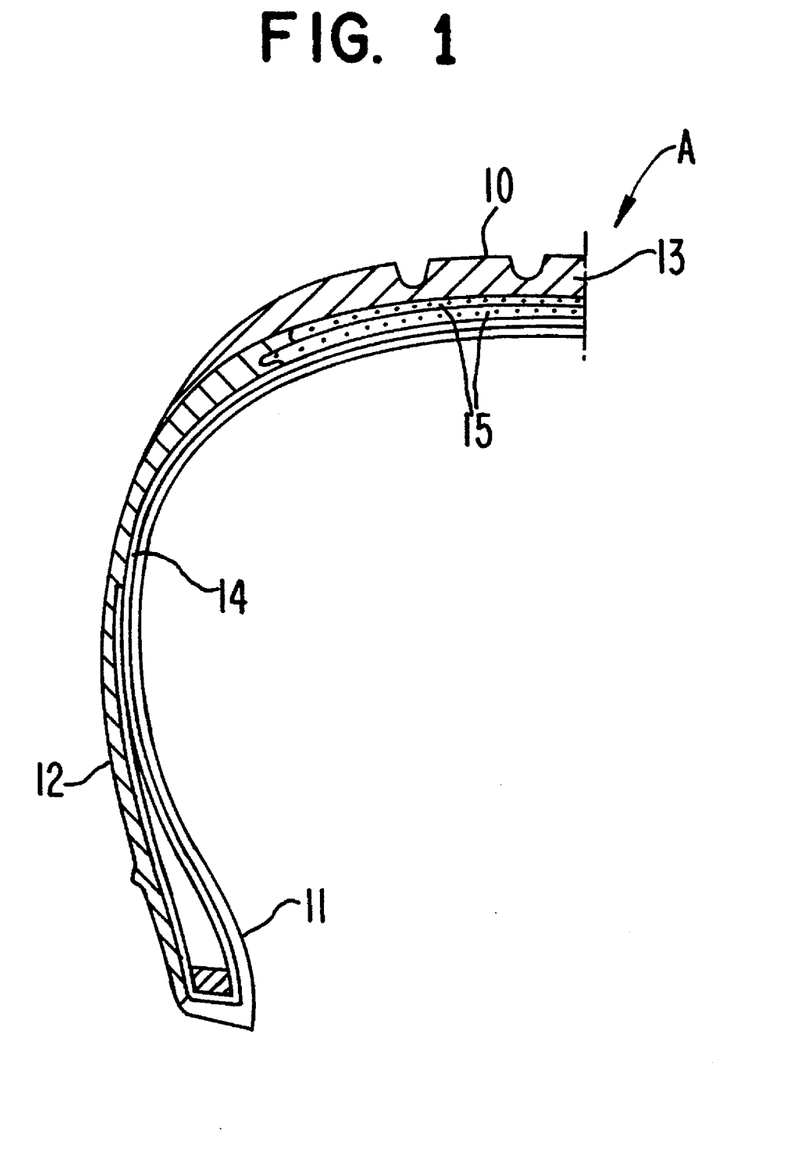
FIG. 1 is a semi-sectional view in the meridian direction explaining an Example of a pneumatic vehicle tire of the present invention.

FIG. 1 is a semi-sectional view in the meridian direction explaining a preferred example of a pneumatic vehicle tire of the present invention. In FIG. 1, the pneumatic vehicle tire A of the present invention is composed of a pair of left and right beads 11, 11, a pair of left and right sidewalls 12, 12 connected to these beads 11, 11, and a tread 13 disposed between these sidewalls 12, 12. Between the pair of left and right beads 11, 11 is attached a carcass layer 14. In the tread 13, a belt layer 15 is disposed so as to surround the outer circumference of the same. Reference numeral 10 is a tread surface.

In the present invention, the tread 13, as mentioned above, is composed of a mixture of a matrix rubber into which has been compounded the low hardness vulcanized rubber composition having an average particle size of less than 1000 μm, the hollow particulates of an average particle size of 10 to 120 μm and an average thickness of 0.1 to 15 μm, and the short fibers of an aspect ratio of 10 to 1000, and further, in the case of the second aspect of the present invention, the low molecular weight diene polymer of an average molecular weight of 6,000 to 60,000.

The type of the matrix rubber compounded to the rubber blend forming the tread is not particularly limited, but preferably use is made of natural rubber, polyisoprene rubber, polybutadiene rubber, styrene-butadiene copolymer rubber, or any blends thereof. A suitable amount of carbon black, softeners, and other compounding ingredients can be compounded into the matrix rubber by any ordinary methods.

The carbon black is not particularly limited in type so long as it can be usually used for treads. The amount of the carbon black compounded is preferably 40 to 100 parts by weight based upon 100 parts by weight of rubber material. When the amount of the carbon black is less than 40 parts by weight, the reinforcing ability is poor and the wear resistance tends to decrease, and therefore, this is not preferable. When the amount is over 100 parts by weight, the heat generation tends to increase, and therefore, this is also not preferable.

In the rubber blend forming the tread of the present invention, a low hardness rubber powder having an average particle size of less than 1000 μm, preferably 10 to 400 μm, is compounded thereto. When the average particle size is over 1000 μm, the wear resistance of the pneumatic vehicle tire becomes lower and the mixing and processing ability during the manufacture of the pneumatic vehicle tire becomes inferior, and therefore, this is not preferable.

The low hardness rubber powder is preferably a rubber blend which is prevulcanized so as to maintain its shape even after vulcanization of the tire. As the starting rubber, use may be made of, for example, natural rubber, polyisoprene rubber, polybutadiene rubber, styrene-butadiene copolymer rubber, halogenated butyl rubber, or blends of two or more thereof. The carbon black may or may not be compounded. When compounded, no more than 20 parts by weight per 100 parts by weight of the rubber should be used. This is because when the amount of the carbon black compounded is increased, the difference in the modulus with the matrix rubber becomes smaller and the adhesive effect falls, and therefore, the performance on ice etc. is not improved. It should be noted that the carbon black is preferably not compounded.

The amount of the low hardness rubber powder compounded to the rubber blend forming the tread of the present invention is 1 to 10 parts by weight, preferably 2 to 4 parts by weight per 100 parts by weight of the matrix rubber. When the amount compounded is less than 1 part by weight, the performance on ice is not sufficiently improved. Contrary to this, when the amount is over 10 parts by weight, the wear resistance is unpreferably falls.

The hollow particulates used in the rubber blend forming the tread according to the present invention should have an average particle size of 10 to 120 μm, preferably 20 to 80 μm, an average wall thickness of 0.1 to 15 μm, preferably 1 to 10 μm, and preferably, an average specific gravity of 0.2 to 1.0. When the average particle size of the hollow particulates is less than 10 μm, the running performance on ice and snow covered roads is not sufficiently improved. Contrary to this, when the average particle size is over 120 μm, there is a tendency for deterioration of the wear resistance, durability, etc. of the tread surface.

When the average thickness is less than 0.1 μm, the hollow particulates become fragile and, as a result, the running performance on the ice- and snow-covered roads is not sufficiently improved. Contrary to this, when the average thickness is over 15 μm, the volume of the hollow portion of the hollow particulates becomes smaller and the running performance on ice- and snow-covered roads is insufficiently improved. The average specific gravity is not that critical, but when the average specific gravity is less than 0.2, the hollow particulates tend to break during the blending operation. Contrary to this, when the average specific gravity is over 1.0, the volume of the hollow portion of the hollow particulates tends to become small and the running performance on ice- and snow-covered roads tends to be insufficiently improved.

As the hollow particulates, use may be made, for example, of any known inorganic fine hollow material such as glass balloons, ceramic balloons, fly ash, carbon balloons, resinous fine hollow materials such as fine hollow phenol resins, epoxy resins, urea resins, etc. The amount of the hollow particulates used in the rubber is not particularly limited, but is preferably 5 parts by weight or less, more preferably 2 parts by weight or less, based upon 100 parts by weight of the matrix rubber. The amount is at least one which sufficiently improves the running performance on ice- and snow-covered roads by the synergistic effect with the low hardness rubber powder. When the compounding amount is conversely too much, the effect of improvement is not substantially changed and there is a tendency of a deterioration in the wear resistance, durability, etc. of the tread.

According to the present invention, short fibers having an aspect ratio of 10 to 1000, preferably 10 to 300 are further compounded into the rubber blend forming the tread in the present invention. As such short fibers, for example, use may be made of natural fibers such as cotton, silk, chemical fibers such as cellulose fibers, polyamide fibers, polyester fibers, polyvinyl alcohol fibers (e.g., vinylon) and inorganic fibers such as carbon fibers. Preferably, polyamide fibers such as nylon fibers or cellulose short fibers such as rayon are used. Especially, use may be made of a master batch of nylon 6 fibers having an average length of 30 μm and average diameter of 0.3 μm surface treated with γ-aminopropyltrimethoxysilane mixed in an amount of 50 parts by weight per 100 parts by weight of natural rubber (commercially available from Ube Industries Ltd. as UBEPOL-HE). Use may also be made of steel short fibers, copper short fibers, and other metal short fibers. Two or more types of these short fibers may be used together.

The amount of the short fibers compounded in the rubber is not particularly limited, but is preferably 1 to 15 parts by weight, more preferably 1 to 5 parts by weight, per 100 parts by weight of the matrix rubber.

Figure 2:
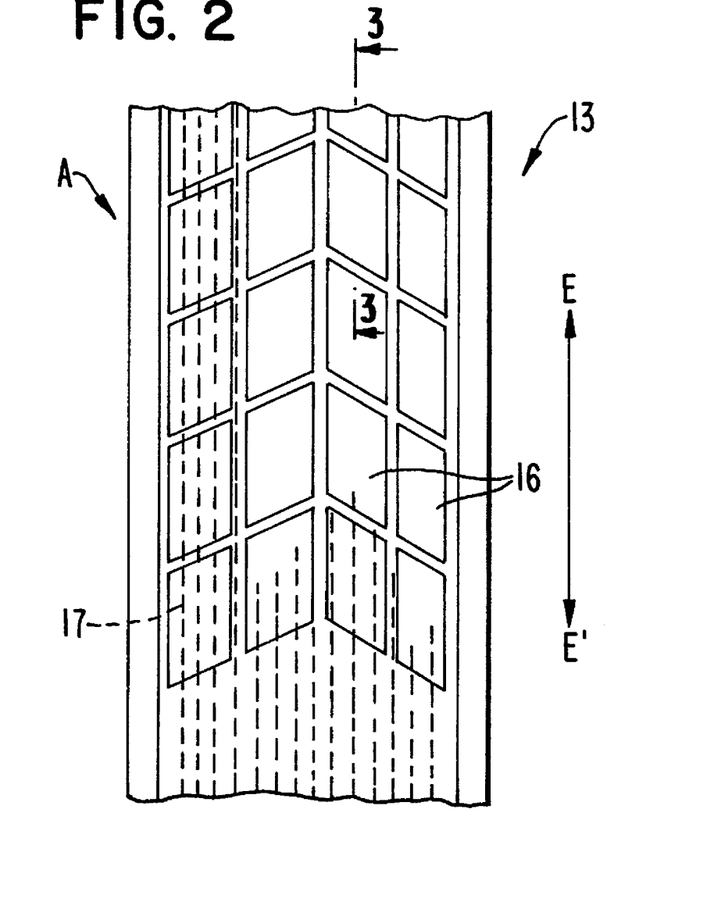
FIG. 2 is a plane view explaining the tread of an Example of a pneumatic vehicle tire of the present invention.
Figure 3:
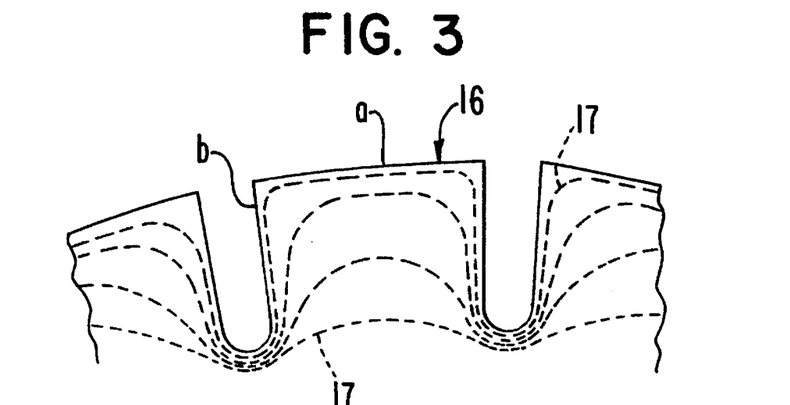
FIG. 3 is a sectional view along the line 3—3 in FIG. 2.

In the present invention, the short fibers are oriented along the surface of the block and sidewalls of the tread 13. The state of the orientation of the short fibers is shown in, for example, FIG. 2 and FIG. 3. FIG. 2 is a plane view explaining the tread of an example of a pneumatic vehicle tire of the present invention, while FIG. 3 is a sectional view along line K-K' of the same. As shown in FIG. 2 and FIG.

3, the short fibers 17 are oriented in the tire circumferential direction EE' along the surface a and the side surface b of the block 16 of the tread 13. In this way, almost all the short fibers are preferably oriented along the block surface and sidewalls of the tread (along the circumferential direction).

To obtain such an orientation of the short fibers, use is made of the fact that, when extruding the tread 13, fibers having a certain ratio of length/diameter tend to align in the direction of flow of the matrix, that is, the rubber. This tendency is due to the fact that when the tire is vulcanized, the unvulcanized tread rubber flows along the mold over the projections of the mold and as a result the short fibers 17 are oriented along the mold projections. For this reason, the short fibers 17 become oriented along the top surface a and side surfaces b of the block 16 of the tread 13. However, the short fibers 17 become randomly aligned in the tread rubber and are not oriented if not having a certain aspect ratio. Therefore, the short fibers must have an aspect ratio of 10 to 1000, preferably 10 to 300. Preferably the average diameter is 0.05 μm or more and the average length is 1 to 5000 μm. More preferably, since the short fibers prevent a decline in the wear resistance and are superior in orientation ability, polyamide short fibers having an average diameter of 0.05 to 0.8 μm and an average length in the range of 1 to 100 μm may be used. Note that when the aspect ratio is over 1000, the distribution of the short fibers in the matrix rubber becomes poor and a sufficient orientation cannot be obtained.

The block 16 with short fibers 17 oriented along the top surface a and the side surfaces b in the above-mentioned way exhibits anisotrophy of the modulus of elasticity wherein the rigidity of the block as a whole is remarkably high, but the modulus of elasticity in the direction perpendicular to the direction of orientation, that is, in the direction from the top surface inward, is not that high. Due to this anisotrophy, the block rigidity of the soft base rubber with the adhesive effect can be reinforced and the block edge effect and rubber adhesive effect can be achieved simultaneously to the maximum extent, so the performance on ice- and snow-covered roads and, of course, the performance on regular roads, can be remarkably improved.

In accordance with the second aspect of the present invention, the liquid polymer is compounded into the above-mentioned rubber blend for the tread according to the present invention. As the liquid polymer, use is made of a low molecular weight diene polymer having a molecular weight of 6,000 to 60,000, which is measured by a gel permeation chromatography (GPC) and is obtained by converting the same to the molecular weight of polystyrene. The determination conditions of GPC are as follows:

Solvent: tetrahydrofuran (THF)

Concentration: 0.05% by weight

Flow rate: 1 ml/min

Column temp: 40° C.

Column: TSK-GEL G6000 HXL (commercially available from TOSOH CORPORATION)

When the molecular weight of the low molecular weight diene polymer is used, the polymer tends to migrate to the undertread portion of the tire. Contrary to this, when the molecular weight is more than 60,000, the desired softening effect becomes small and the desired physical properties cannot be obtained.

As the low molecular weight diene polymer, any diene polymers such as butadiene polymers, isoprene polymers, acrylonitrile-butadiene copolymers, aromatic vinyl-butadiene copolymers, etc. can be used so long as bleeding phenomenon does not occur (i.e., the polymer is not bled from the surface of the rubber blend). The preferable diene polymers are butadiene polymers having a cis-1,4 content of 70% or more, more preferably 75% or more. When the cis-1,4 content is less than 70%, the hardness at a low temperature becomes high (i.e., hard), the performance on ice tends to decrease. Although the low molecular weight diene polymer having a functional group such as $>C=N^+<$ (e.g., N-methyl-2-pyrrolidone, N-methyl-β-propiolactum etc.) at the terminal thereof is conventionally known, the effects obtained by the present invention do not depend on the presence or absence of such terminal groups. Thus, the above-mentioned terminal functional group or any kinds of terminal groups may be or may not be present in the low molecular weight diene polymer according to the present invention. The present effects may depend on the basic structure of the diene polymer.

According to the present invention, the diene polymer having a weight-average molecular weight of 6,000 to 60,000, preferably 6,000 to 50,000 is compounded in an amount of 5 to 50 parts by weight, preferably 5 to 30 parts by weight based upon 100 parts by weight of the matrix rubber. When the amount of the low molecular weight diene polymer is less than 5 parts by weight, the amount is too small to obtain the desired results. Contrary to this, when the amount is more than 50 parts by weight, the mooney viscosity of the unvulcanized rubber is decreased, and therefore, the processing ability becomes practically unpreferably worse. In the present invention, in addition to the above-mentioned essential components, various types of conventional additives for vehicle tires can be compounded into the rubber blend. The amounts thereof may also be made the amounts generally used. As such optional additives, mention may be made of vulcanization accelerators, age resistors, fillers, softeners, plasticizers, etc. The pneumatic vehicle tire according to the present invention may be manufactured using any conventional methods and apparatuses other than as required for vulcanizing the above-mentioned rubber blend for the tread.

In accordance with the present invention, the above-mentioned specific low hardness rubber powder, hollow particulates, and short fibers, as well as the liquid polymer in the case of the second aspect of the present invention, are mixed in the matrix rubber of the rubber blend forming the tread of the pneumatic vehicle tire. By compounding the low hardness rubber powder, fine low modulus portions are formed in the rubber, the adhesion on ice-covered road surfaces etc. becomes better, the rubber powder contacting the road surface gives a high adhesive effect, the block of the low hardness rubber powder is reinforced by the use of specific short fibers with this, a sufficient frictional force on ice is obtained even in the area with relatively low amounts of the rubber powder, and the wear resistance, mixability, etc. are also improved.

In accordance with the present invention, further, by compounding the hollow particulates, fine hard portions are formed in the rubber, the adhesion on an ice-covered road surface becomes better, and a plowing effect can be caused on the fine uneven portions formed on the tread surface.

EXAMPLES

The present invention will now be explained in further detail by, but is by no means limited to, the following Examples and Comparative Examples.

Examples 1 to 3 and Comparative Examples 1 to 8

Pneumatic vehicle tires of the structure shown in FIG. 1 were made by a conventional method using the tread rubber compounds having the compositions (parts by weight) shown in Table 1. The tire size was 185/70 R13 85Q. The cord angle of the carcass layer 4 was made about 90° with respect to the circumferential direction of the tire. The following evaluations were effected using as a test car a 1600 cc front-engine front-wheel drive car. The results are shown in Table 2.

Dynamic Modulus (Circumferential Direction and Radial Direction) MPa)

Samples were cut out from the sidewalls of the tread blocks of the test tires in the circumferential direction (same as circumferential direction of tire) with respect to the tire shaft and the radial direction. A viscoelasticity spectrometer made by Toyo Seiki Co., Ltd. was used to measure samples of a chuck distance of 10 mm, a width of 5 mm, and a thickness of 2 mm under conditions of a frequency of 20 Hz, an initial strain of 10%, a dynamic strain of ±2%, and a temperature of 0° C. The larger the figures, the greater the rigidity.

Braking Performance on Ice-Covered Road Surface

The tires were run on an ice sheet at an initial speed of 30 km/h, the stopping distance upon braking was measured, and the result was indicated as an index using preliminarily run (300 km) conventional tires (as a control) as 100. The larger the value, the better the braking. Note that the tires were all tested after being preliminarily run for 300 km on a dry road.

Traction on Snow-Covered Road Surface

A packed snow road surface was repeatedly braked on by a passenger car to make the road surface slippery. A climbing test of a gradient of 5% (2.9°) was performed on this slippery packed snow road surface. The climbing acceleration time for a 30 m distance was measured from zero start over a 30 m distance method and the results were shown as indexes with respect to a conventional tire. The larger the figure, the better the traction. Note that the tires were all tested after being preliminarily run for 300 km on a dry road.

Braking Performance on Wet Road Surface

The tires were run on a wet asphalt road surface at an initial speed of 40 km/h, the stopping distance upon braking was measured, and the results were indicated as an index using conventional tires (as a control) as 100. The larger the value, the better the braking. Note that the tires were all tested after being preliminarily run for 300 km on a dry road.

Wear Resistance (On Dry Roads)

The tires were run for 20,000 km on a dry road surface under the ordinary design load and air pressure conditions prescribed by the JATMA (i.e., Japan Automobile tire Manufacturer's Association), then the amounts of wear of the tires were shown as indexes with respect to the amount of wear of a conventional tire (as a control). The larger the value, the better the wear resistance.

Mixing and Processing Ability

The knitting performance of the mixed rubber, the bagging at the rolls, the die swell, the state of the extrudate, etc. were scored by a five point system. The higher the score, the better the result.

TABLE 1

|  | Control | Example | | | Comparative Example | | | | | | | |
|---|---|---|---|---|---|---|---|---|---|---|---|---|
|  |  | 1 | 2 | 3 | 1 | 2 | 3 | 4 | 5 | 6 | 7 | 8 |
| Polymer NR | 60 | 60 | 60 | 60 | 60 | 60 | 60 | 60 | 60 | 60 | 60 | 60 |
| Polymer BR[1] | 40 | 40 | 40 | 40 | 40 | 40 | 40 | 40 | 40 | 40 | 40 | 40 |
| Carbon black | 75 | 75 | 75 | 75 | 75 | 75 | 75 | 75 | 75 | 75 | 75 | 75 |
| Oil | 18 | 21 | 22 | 21 | 20 | 20 | 20 | 20 | 20 | 21 | 21 | 22 |
| Stearic acid | 3 | 3 | 3 | 3 | 3 | 3 | 3 | 3 | 3 | 3 | 3 | 3 |
| Antioxidant[2] | 2 | 2 | 2 | 2 | 2 | 2 | 2 | 2 | 2 | 2 | 2 | 2 |
| Zinc oxide | 3 | 3 | 3 | 3 | 3 | 3 | 3 | 3 | 3 | 3 | 3 | 3 |
| Wax | 1 | 1 | 1 | 1 | 1 | 1 | 1 | 1 | 1 | 1 | 1 | 1 |
| Sulfur | 1.5 | 1.5 | 1.5 | 1.5 | 1.5 | 1.5 | 1.5 | 1.5 | 1.5 | 1.5 | 1.5 | 1.5 |
| Vulcanization accelerator[3] | 1 | 1 | 1 | 1 | 1 | 1 | 1 | 1 | 1 | 1 | 1 | 1 |
| Low hardness rubber powder A[4] | — | 4 | 4 | 2 | — | — | 15 | 4 | 4 | — | 15 | 4 |
| Low hardness rubber powder B[5] | — | — | — | — | 4 | — | — | — | — | 4 | — | — |
| Low hardness rubber powder C[6] | — | — | — | — | — | 4 | — | — | — | — | — | — |
| Short fiber A[7] | — | 2 | 1 | 1.5 | 2 | 2 | 2 | — | — | 2 | 2 | 1 |
| Short fiber B[8] | — | — | 1 | — | — | — | — | — | — | — | — | 1 |
| Short fiber C[9] | — | — | — | — | — | — | — | 5 | — | — | — | — |
| Short fiber D[10] | — | — | — | — | — | — | — | — | 5 | — | — | — |
| Hollow particulate A[11] | — | 1 | 3 | 0.5 | — | — | — | — | — | 1 | 1 | — |
| Hollow particulate B[12] | — | — | — | — | — | — | — | — | — | — | — | 3 |

TABLE 2

|  | Control | Example | | | Comparative Example | | | | | | | |
|---|---|---|---|---|---|---|---|---|---|---|---|---|
|  |  | 1 | 2 | 3 | 1 | 2 | 3 | 4 | 5 | 6 | 7 | 8 |
| Dynamic Young's modulus (MPa) | | | | | | | | | | | | |
| (Radial direction) | 6.3 | 6.1 | 6.1 | 6.0 | 5.9 | 6.1 | 5.8 | 6.5 | 6.6 | 6.0 | 6.0 | 6.2 |
| (Circumferential direction) | 6.3 | 6.6 | 6.5 | 6.4 | 6.5 | 6.6 | 6.4 | 6.5 | 6.6 | 6.6 | 6.5 | 6.7 |
| Braking performance (on ice) | 100 | 110 | 110 | 108 | 108 | 100 | 109 | 101 | 99 | 109 | 110 | 109 |
| Traction (on snow) | 100 | 109 | 111 | 106 | 105 | 101 | 106 | 99 | 100 | 109 | 110 | 110 |
| Braking performance (on wet roads) | 100 | 101 | 102 | 101 | 99 | 100 | 99 | 100 | 99 | 100 | 100 | 102 |
| Wear resistance | 100 | 96 | 95 | 98 | 90 | 97 | 85 | 95 | 91 | 89 | 83 | 89 |
| Mixing and processing ability | 5 | 5 | 5 | 5 | 5 | 5 | 4 | 4 | 3 | 5 | 4 | 5 |

(1) BR . . . cis content 98%, Tg-103° C.

(2) N-(1,3-dimethyl)-N'-phenyl-p-phenylenediamine (3) N-tertiary-butyl-2-benzothiazole-sulfanemide (4) Low hardness rubber powder A . . . Vulcanized rubber pulverate of NR pure gum compound stock (average particle size 200 μm, carbon 0 phr)

(5) Low hardness rubber powder B . . . Vulcanized rubber pulverate of NR pure gum compound stock (average particle size 1500 μm, carbon 0 phr)

(6) Low hardness rubber powder C . . . Vulcanized rubber pulverate of NR pure gum compound stock (average particle size 200 μm, carbon 40 phr)

(7) Short fiber A . . . nylon 6 short fiber, average length 30 μm, average diameter 0.3 μm (8) Short fiber B . . . cellulose short fiber, average length 1500 μm, average diameter 12 μm (9) Short fiber C . . . carbon short fiber, average length 5 μm, average diameter 1 μm (10) Short fiber D . . . polyester short fiber, average length 8000 μm, average diameter 5 μm (11) Hollow particulate A . . . glass balloons, average particle size 40 μm, average thickness 2 μm, average specific gravity 0.7

(12) Hollow particulate B . . . kureka spheres (carbonaceous balloons), average particle size 200 μm, average thickness 6 μm, average specific gravity 0.6

As shown in Table 1, the control is a typical conventional tire compound not including low hardness rubber powder, short fibers, and hollow particulates. Table 2 shows the evaluation results of other Examples indexed to the conventional control tire as 100.

The tires of Examples 1 to 3 according to the present invention are not different in braking performance on wet roads as the conventional tire, the reduction in wear resistance is substantially within the allowable range, and the running performances on ice and on snow are remarkably improved.

Contrary to the above, since the compound of Comparative Example 1 has rubber powder having a particle size of over 1000 μm, the wear resistance remarkably declines and the compound is no longer practical. The compound of Comparative Example 2 has a large amount of carbon in the rubber powder, and therefore, no improvement in the performance on ice- or snow-covered roads is observed. Comparative Example 3 has too large an amount of mixture of rubber powder, and therefore, the wear resistance is remarkably reduced. Comparative Examples 4 and 5 have short fibers having the aspect ratios outside the scope of the present invention, and therefore, no improvement in performance on ice- or snow-covered roads is observed. Note that the compounds of Comparative Examples 1 to 5 do not contain hollow particulates.

In Comparative Example 6, since the particle size of the rubber powder is larger than 1000 μm, while the hollow particulates were compounded, the wear resistance is greatly reduced. In Comparative Example 7, the amount of the rubber powder is too great, so the wear resistance is greatly reduced. In Comparative Example 8, since the particle size of the hollow particulates is too large, the wear resistance is reduced.

Examples 4–7, Reference Examples 1–3 and Comparative Examples 9–17

Pneumatic vehicle tires of the structure shown in FIG. 1 were made by a conventional method using the tread rubber compounds having the compositions (parts by weight) shown in Tables 3 and 4. The tire size was 185/70 R13 85Q. The cord angle of the carcass layer 4 was made about 90° with respect to the circumferential direction of the tire. The above-mentioned evaluations were effected using as a test car a 1600 cc front-engine front-wheel drive car. The results are shown in Tables 5 and 6.

TABLE 3

| | Control | Example 4 | Example 5 | Example 6 | Example 7 | Reference Example 1 | Reference Example 2 | Reference Example 3 |
|---|---|---|---|---|---|---|---|---|
| Polymer NR | 60 | 60 | 60 | 60 | 60 | 60 | 60 | 60 |
| Polymer BR[1] | 40 | 40 | 40 | 40 | 40 | 40 | 40 | 40 |
| Carbon black | 75 | 75 | 75 | 75 | 75 | 75 | 75 | 75 |
| Oil | 30 | 12 | 13 | 12 | — | 20 | 30 | 30 |
| Stearic acid | 3 | 3 | 3 | 3 | 3 | 3 | 3 | 3 |
| Antioxidant[2] | 2 | 2 | 2 | 2 | 2 | 2 | 2 | 2 |
| Zinc oxide | 3 | 3 | 3 | 3 | 3 | 3 | 3 | 3 |
| Wax | 1 | 1 | 1 | 1 | 1 | 1 | 1 | 1 |
| Sulfur | 1.5 | 1.5 | 1.5 | 1.5 | 1.5 | 1.5 | 1.5 | 1.5 |
| Vulcanization accelerator[3] | 1 | 1 | 1 | 1 | 1 | 1 | 1 | 1 |
| Low hardness rubber powder A[4] | — | 4 | 4 | 2 | 2 | 4 | 4 | 4 |
| Low hardness rubber powder B[5] | — | — | — | — | — | — | — | — |
| Low hardness rubber powder C[6] | — | — | — | — | — | — | — | — |
| Short fiber A[7] | — | 2 | 1 | 1.5 | 1.5 | 2 | 2 | 2 |
| Short fiber B[8] | — | — | 1 | — | — | — | — | — |
| Short fiber C[9] | — | — | — | — | — | — | — | — |
| Short fiber D[10] | — | — | — | — | — | — | — | — |
| Hollow particulate A[11] | — | 1 | 3 | 0.5 | 0.5 | — | 1 | — |
| Hollow particulate B[12] | — | — | — | — | — | — | — | — |
| Liquid polymer A[13] | — | 20 | 20 | 20 | 30 | — | — | 20 |
| Liquid polymer B[14] | — | — | — | — | — | — | — | — |
| Liquid polymer C[15] | — | — | — | — | — | — | — | — |

[1]–[12]See Table 1
[13]Liquid polymer A . . . liquid polybutadiene, Mw = 15,000, 1,4-cis content = 80%
[14]Liquid polymer B . . . liquid SBR, Mw = 5,000, styrene content = 30 wt %
[15]Liquid polymer C . . . liquid SBR, Mw = 65,000, styrene content = 30 wt %

TABLE 4

| | Control | Comparative Example 9 | 10 | 11 | 12 | 13 | 14 | 15 | 16 | 17 |
|---|---|---|---|---|---|---|---|---|---|---|
| Polymer NR | 60 | 60 | 60 | 60 | 60 | 60 | 60 | 60 | 60 | 60 |
| Polymer BR[1] | 40 | 40 | 40 | 40 | 40 | 40 | 40 | 40 | 40 | 40 |
| Carbon black | 75 | 75 | 75 | 75 | 75 | 75 | 75 | 75 | 75 | 75 |
| Oil | 30 | 30 | 12 | 12 | 12 | 12 | 12 | 13 | 12 | 12 |
| Stearic acid | 3 | 3 | 3 | 3 | 3 | 3 | 3 | 3 | 3 | 3 |
| Antioxidant[2] | 2 | 2 | 2 | 2 | 2 | 2 | 2 | 2 | 2 | 2 |
| Zinc oxide | 3 | 3 | 3 | 3 | 3 | 3 | 3 | 3 | 3 | 3 |
| Wax | 1 | 1 | 1 | 1 | 1 | 1 | 1 | 1 | 1 | 1 |
| Sulfur | 1.5 | 1.5 | 1.5 | 1.5 | 1.5 | 1.5 | 1.5 | 1.5 | 1.5 | 1.5 |
| Vulcanization accelerator[3] | 1 | 1 | 1 | 1 | 1 | 1 | 1 | 1 | 1 | 1 |
| Low hardness rubber powder A[4] | — | 4 | — | — | 15 | 4 | 4 | 4 | 4 | 4 |
| Low hardness rubber powder B[5] | — | — | 4 | — | — | — | — | — | — | — |
| Low hardness rubber powder C[6] | — | — | — | 4 | — | — | — | — | — | — |
| Short fiber A[7] | — | 2 | 2 | 2 | 2 | — | — | 1 | 2 | 2 |

TABLE 4-continued

|  | Control | Comparative Example | | | | | | | | |
|---|---|---|---|---|---|---|---|---|---|---|
|  |  | 9 | 10 | 11 | 12 | 13 | 14 | 15 | 16 | 17 |
| Short fiber B[8] | — | — | — | — | — | — | — | 1 | — | — |
| Short fiber C[9] | — | — | — | — | — | 5 | — | — | — | — |
| Short fiber D[10] | — | — | — | — | — | — | 5 | — | — | — |
| Hollow particulate A[11] | — | — | 1 | 1 | 1 | 1 | 1 | — | 1 | 1 |
| Hollow particulate B[12] | — | — | — | — | — | — | — | 3 | — | — |
| Liquid polymer A[13] | — | — | 20 | 20 | 20 | 20 | 20 | 20 | — | — |
| Liquid polymer B[14] | — | — | — | — | — | — | — | — | 20 | — |
| Liquid polymer C[15] | — | — | — | — | — | — | — | — | — | 20 |

[1]-[12] See Table 1
[13] Liquid polymer A ... liquid polybutadiene, Mw = 15,000, 1,4-cis content = 80%
[14] Liquid polymer B ... liquid SBR, Mw = 5,000, styrene content = 30 wt %
[15] Liquid polymer C ... liquid SBR, Mw = 65,000, styrene content = 30 wt %

TABLE 5

|  | Control | Example | | | | Reference Example | | |
|---|---|---|---|---|---|---|---|---|
|  |  | 4 | 5 | 6 | 7 | 1 | 2 | 3 |
| Dynamic Young's modulus (MPa) | | | | | | | | |
| (Radial direction) (New tire) | 4.9 | 4.7 | 4.6 | 4.6 | 4.8 | 6.0 | 4.6 | 4.7 |
| (Circumferential direction) (New tire) | 4.9 | 5.5 | 5.3 | 5.4 | 5.7 | 6.3 | 5.4 | 5.4 |
| (Radial direction) (after run) | 6.8 | 5.5 | 5.4 | 5.3 | 5.1 |  | 6.7 | 5.5 |
| Braking performance (on ice) (preliminary run) | 100 | 110 | 110 | 108 | 109 | 108 | 108 | 108 |
| Braking performance (on ice) (after run) | 89 | 105 | 104 | 103 | 107 |  | 97 | 103 |
| Traction (on snow) | 100 | 107 | 111 | 107 | 108 | 106 | 107 | 107 |
| Braking performance (on wet roads) | 100 | 102 | 103 | 102 | 103 | 100 | 100 | 101 |
| Wear resistance | 100 | 97 | 97 | 99 | 100 | 96 | 94 | 98 |
| Mixing and processing ability | 5 | 5 | 5 | 5 | 5 | 5 | 5 | 5 |

TABLE 6

|  | Control | Comparative Example | | | | | | | | |
|---|---|---|---|---|---|---|---|---|---|---|
|  |  | 9 | 10 | 11 | 12 | 13 | 14 | 15 | 16 | 17 |
| Dynamic Young's modulus (MPa) | | | | | | | | | | |
| (Radial direction) (New tire) | 4.9 | 4.6 | 4.7 | 4.9 | 4.6 | 5.7 | 5.9 | 4.7 | 4.6 | 6.5 |
| (Circumferential direction) (New tire) | 4.9 | 5.2 | 5.6 | 5.8 | 5.4 | 5.7 | 5.9 | 5.4 | 5.4 | 7.1 |
| (Radial direction) (after run) | 6.8 | 6.6 | 5.5 | 5.7 | 5.4 | 6.5 | 6.6 | 5.4 | 6.4 | 7.0 |
| Braking performance (on ice) (preliminary run) | 100 | 107 | 110 | 101 | 110 | 101 | 100 | 110 | 109 | 102 |
| Braking performance (on ice) (after run) | 89 | 96 | 104 | 96 | 105 | 95 | 94 | 104 | 99 | 96 |
| Traction (on snow) | 100 | 106 | 108 | 102 | 109 | 101 | 102 | 109 | 106 | 101 |
| Braking performance (on wet roads) | 100 | 99 | 101 | 102 | 101 | 101 | 100 | 102 | 101 | 102 |
| Wear resistance | 100 | 95 | 91 | 97 | 85 | 96 | 92 | 91 | 96 | 98 |
| Mixing and processing ability | 5 | 5 | 5 | 5 | 4 | 4 | 3 | 5 | 5 | 5 |

As explained above, according to the first aspect of the present invention, by compounding the specific low hardness rubber powder, hollow particulates, and short fibers into the tread, it is possible to greatly improve the running performances on ice- and snow-covered roads, while suppressing the reduction in wear resistance—without impairing the running performance on usual wet roads. Furthermore, according to the second aspect of the present invention, by further compounding the specified liquid polymer into the tread, it is possible to greatly improve the running performances on ice- and snow-covered roads at the initial and with the elapse of time, without substantially reducing the wear resistance and without impairing the running performance on usual wet roads.

As shown in Tables 5 and 6, the control is a typical conventional tire compound not including low hardness rubber powder, short fibers, hollow particulates, and liquid polymer. Tables 5 and 6 show the evaluation results of other Examples indexed to the conventional control tire as 100.

The tires of Examples 4 to 7 according to the present invention are not different in braking performance on wet roads as the conventional tire, the reduction in wear resistance is not substantially decreased, and the running performances on ice and on snow at the initial and with the elapse of time are remarkably improved. The data shown in Reference Example 1 is that disclosed in another application filed by the applicant (i.e., Japanese Patent Application No. 5-118668 filed May 20, 1993).

Contrary to the above, since the compound of Comparative Example 9 does not contain the hollow particulates and the liquid polymer, the running performance on ice is practically unpreferably changed with the elapse of time. The compound of Comparative Example 10 contains the rubber powder having a particle size of more than 1000 μm, and therefore, the wear resistance is practically unpreferably decreased. The compound of Comparative Example 11 containing a too large amount of the carbon black in the rubber powder does not provide the improvement in the performance for ice- and snow-covered roads. The compound of Comparative Example 12 containing a too large amount of the rubber powder remarkably decreases the wear resistance. In Comparative Examples 13 and 14, since the aspect ratio of the short fibers are outside of the scope defined in the present invention, the improvement in the performance on ice- and snow-covered roads is not accomplished. Since the particle size of the hollow particulates in Comparative Example 15 is larger than 120 μm, the decrease in the wear resistance is large and the mixing and processing ability becomes poor. In Comparative Example 16, since the molecular weight of the liquid polymer is less than 6,000, the-performance on ice is decreased with the elapse of time and in Comparative Example 17, since the molecular weight of the liquid polymer is more than 60,000, the plasticity effect is not sufficient, and therefore, the improvement in the performance on ice-covered roads is not observed and the change with the elapse of time is also large.

What is claimed is:

1. A pneumatic vehicle tire comprising a tread composed of:
   (a) 100 parts by weight of a matrix rubber;
   (b) 1 to 10 parts by weight of a low hardness rubber powder having an average particle size of 10 to 400 μm and containing 20 parts by weight or less of carbon black per 100 parts by weight of the rubber powder;
   (c) 0.5 to 5 parts by weight of hollow particles having an average particle size of 10 to 120 μm and an average wall thickness of 0.1 to 15 μm;
   (d) 1 to 15 parts by weight of short fibers having an average diameter of 0.05 μm or more, an average length of 1 to 5000 μm and an aspect ratio of 10 to 1000, said fibers being selected from the group consisting of polyamide short fibers, cellulose short fibers, carbon short fibers and polyester short fibers; and
   (e) 5 to 50 parts by weight of a liquid polymer having a weight-average molecular weight of 6,000 to 60,000.

2. A pneumatic vehicle tire as claimed in claim 1, wherein said short fibers are polyamide short fibers having an average diameter of from 0.05 to 0.8 μm and an average length of from 1 to 100 μm.

3. A pneumatic vehicle tire as claimed in claim 1, wherein the amount of the hollow particulates is 5 parts by weight per 100 parts by weight of the matrix rubber.

4. A pneumatic vehicle tire as claimed in claim 1, wherein said liquid polymer is a diene polymer.

* * * * *